Aug. 9, 1966 J. A. CORNELL 3,265,202
COMPOSITE TOOTH AND VENEER GEL COMPOSITE FORMED OF NON-VOLATILE
DIMETHACRYLATE AS THE SOLE POLYMERIZABLE CONSTITUENT
Filed June 26, 1964

FIG.1

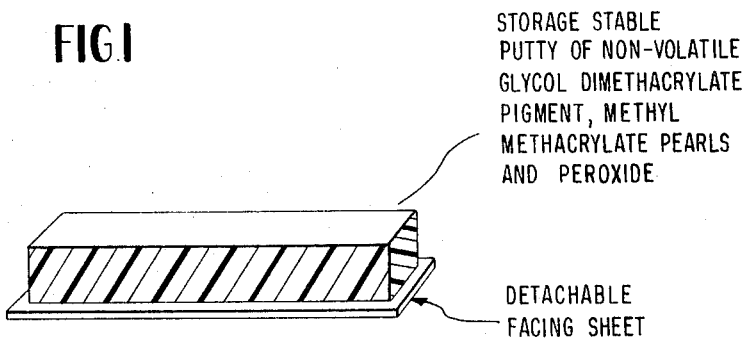

STORAGE STABLE
PUTTY OF NON-VOLATILE
GLYCOL DIMETHACRYLATE
PIGMENT, METHYL
METHACRYLATE PEARLS
AND PEROXIDE

DETACHABLE
FACING SHEET

FIG.2

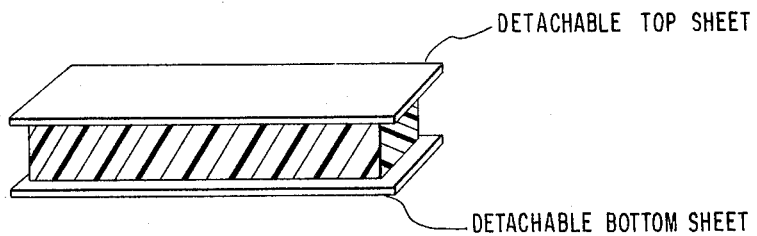

DETACHABLE TOP SHEET

DETACHABLE BOTTOM SHEET

INVENTOR
JOHN A. CORNELL

BY *Abraham A. Saffitz*

ATTORNEY 3,265,202
COMPOSITE TOOTH AND VENEER GEL COMPOSITE FORMED OF NON-VOLATILE DIMETHACRYLATE AS THE SOLE POLYMERIZABLE CONSTITUENT
John A. Cornell, Philadelphia, Pa., assignor to H. D. Justi Division, Williams Gold Refining Company, Inc., Buffalo, N.Y., a corporation of New York
Filed June 26, 1964, Ser. No. 378,457
5 Claims. (Cl. 206—63.5)

This invention relates to a novel, pasty, polymerizable synthetic resin dental dough composition useful in cured form as a hard, tough, wear-resistant dental product and especially useful in the form of a composite artificial plastic tooth, and also useful as a dental patching, restoring or sealing composition in the form of a preformed strip of putty, generally pigmented to match a natural tooth. The pasty dental dough composition of the invention is uniquely characterized by its very low volatility and its long shelf life at room temperature (at least six months and longer) before curing and by its outstanding wear-resistance and toughness after curing. Both of these advantageous attributes are unexpectedly superior in the dental dough of the present invention as compared with the standard methacrylate dough mixture of the prior art.

The novel composition of the invention is a storage-stable putty characterized by a long shelf life and adapted for general sealing utility in forms as illustrated in the attached drawing, wherein:

FIG. 1 shows a strip of storage stable putty of non-volatile glycol dimethacrylate pigment, methyl methacrylate pearls and peroxide mounted on a detachable facing sheet; and FIG. 2 shows a strip of the putty mounted between detachable top and bottom facing sheets.

The basic novel composition consists essentially of a mixture of a non-volatile liquid difunctional ester of acrylic and methacrylic acid with certain dihydric aliphatic alcohols having 4 to 8 carbon atoms as the liquid component and as the resin filler thickening said liquid, a finely divided methyl methacrylate polymer or copolymer of methyl methacrylate, the volatility of the liquid difunctional methacrylate or acrylate monomer being less than that of dibutyl phthalate for long shelf life, while the hardness of the cured liquid phase achieves maximum benefits of outstanding wear-resistance.

Since both the solid phase and the liquid phase of the dough putty consists of an optically transparent acrylic resin, there results a mixed resin having highly desirable transparency qualities which provide the advantages of accurate and faithful color and shade reproducibility when matching pigmented dough formulations to natural teeth. The liquid non-volatile dimethacrylate ester, which is the sole material constituting the liquid phase in which the resin filler and pigment are dispersed, has excellent wetting properties for opacifying pigments which are acceptable for dental use, e.g., such pigments as titanium dioxide, zinc oxide, copper oxide, iron oxide, cobalt oxide, barium sulfate, carbon black, burnt umber, cadmium selenide, cadmium sulfide and mixtures of the foregoing.

The present invention is based upon the discovery that, while certain non-volatile monomers are very well suited for use as artificial composite, they are too brittle for use as repairing, restoring and patching material. It would be expected that acrylate diesters would be so brittle as to be totally unsuitable for use as a tooth. A sharp blow made to an outer surface of the brittle diacrylate ester would shatter it. Indeed, it is unexpected to find that the tooth structure will resist shattering if made in composite form by molding a surfacing portion consisting of the present dough composition about and around a central core portion consisting of solid polymethyl methacrylate.

The composite tooth structure consisting of polymethyl methacrylate core and wear-resistant outer plastic material is known and methods for manufacturing this tooth are known. An example of the composite tooth structure is seen in the U.S. patent to Gotlib, No. 2,793,436, or to Saffir, No. 2,477,268. Methods for manufacturing the composite teeth are described in Feagin, U.S. patent No. 2,528,219. Illustration of teeth or methods for their manufacture could not be shown in drawings since such drawings would not differ from conventional showings referred to above. The advantages are based on the composition in the unique dental form, a first group of compositions being based upon non-volatile, somewhat brittle materials for composite tooth manufacture and a second group of compositions embracing all but the butylene and propylene glycols in the first group.

Heretofore, it was thought that none of these polyglycols could be made in non-porous (highly foamed) embodiments without being unduly brittle. Indeed, the only utility known for the pure solid diester is the highly porous, prosthetic product of Wichterle et al. in U.S. Patent No. 2,976,576, granted March 28, 1961. It was proposed by Wichterle et al. to use the product as a sponge, filter or surgical implant in blood vessels, etc. It is important to note that Wichterle et al. polymerize the monomer alone and did not attempt any processing of the dough mixtures.

It will be seen from the foregoing that the liquid component for the tooth consists of a dimethacrylate ester having from 4 to 8 carbon atoms in the alcohol or polyethylene glycol having a degree of polymerization of 2 to 6 or polypropylene glycol having a degree of polymerization of 2 to 6, while in the restoration material, hereinafter called veneer gel, the ester contains an alcohol having from 5 to 8 carbon atoms and the same ethylene and propylene glycol esters with a degree of polymerization of 2 to 6 can be used.

The distinction between these two types is based also upon the volatility characteristics.

These certain non-volatile difunctional monomers which are unsuitable for veneer gel uses, although suitable for the manufacture of composite acrylic teeth, are butylene glycol dimethacrylates and diacrylates in which both linear and branched types of butylene glycol are present and the propylene glycol dimethacrylates and diacrylates which are both of the linear and branched types.

Dibutyl phthalate is one of the standard materials of non-volatile characteristics, acknowledged in the art as a non-volatile material, which is compared to the non-volatile liquid component of the present invention.

Another component which is compared is methyl methacrylate monomer having a boiling point of 100° C.

A third component is ethylene glycol dimethacrylate, hereinafter called EDMA. This material is the standard cross-linking agent in commerce but is excluded in the veneer gel of the present invention.

The following illustrates the characteristics of non-volatility which resulted in excluding EDMA and preferring triethylene glycol dimethacrylate.

The volatility of monomeric triethylene glycol dimethacrylate, the preferred cross-linking monomer phase, is very close to the volatility of dibutyl phthalate. The following vapor pressure and temperature data are submitted in order to illustrate the relative volatility of the non-volatile cross-linker constituting the entire monomer phase of the dental dough in comparison to methyl methacrylate and dibutyl phthalate.

VOLATILITY IN mm. Hg

|  | 0° C. | 50° C. | 100° C. | 150° C. |
|---|---|---|---|---|
| Methyl methacrylate | 8.5 | 125 | 760 |  |
| Dibutyl phthalate | 0.001 | 0.008 | 0.1 | 1.5 |
| Triethylene glycol dimethacrylate (SR 205) (TEDMA) | 0.001 | 0.01 | 0.01 | 1 |
| Tetraethylene glycol dimethacrylate | 0.001 | 0.01 | 0.01 | 0.1 |
| Polyethylene glycol 200 dimethacrylate | 0.01 | 0.01 | 0.01 | 2 |
| 1,3-butylene glycol dimethacrylate | 0.01 | 0.1 | 1 | 15 |
| Ethylene glycol dimethacrylate (EDMA) | 0.01 | 0.1 | 8 | 120 |

The volatility of EDMA at 100° C. is such that about 4% evaporates in 4 hours at 100° C. and about 8% evaporates in 8 hours.

The solvency power of EDMA at 100° C. is very much greater than that of TEDMA at 100° C. Similarly, the solvency of ethylene glycol dimethacrylate is so great that at room temperature a mixture of polymer and monomer, as in the preferred coposition using ethylene glycol dimethacrylate, will get and become too stiff to be operable. From the foregoing comparison it will be seen that only EDMA presents that velocity which represents a weight loss at long enough time while with all of the other dimethacrylates, the volatility behavior is far superior to that of the standard, dibutyl phthalate.

The cross-link density of EDMA is so high that cured EDMA dough products are excessively brittle while TEDMA products are not objectionably brittle. Also, each of the dimethacrylates, including the more volatile EDMA, provides compositions which are completely impervious to water and are also resistant to saponification by chemical agents present in the mouth. It is believed that, as a result of these characteristics which are inherent in the longer chain cross-linking structure as well as in the ester portion of the molecule, there is provided a beneficial plasticizing action to the cured tooth decreasing brittleness which is completely surprising in view of its effectiveness as a cross-linking agent.

These characteristics are to be contrasted with glycol diacetate and diglycol diacetate. An illustration is given in terms of glycol diacetate which is an excellent solvent and dissolves much more polymer than dibutyl phthalate to form a stickier dough which is more difficult to mix. At the processing temperature of 100° C. glycol diacetate has a very high evaporation rate. In about 4 hours 30% will evaporate, during a 9 hour shift 40% will evaporate and in 16 hours 60% will evaporate. Thus, if this plasticizer is incorporated into a denture and heated to 100° C. overnight, the majority of this liquid softening agent will be lost by such heating. It is also extractable from the completed denture imparting no permanence to the flexibility obtained, and quite different from the hardness and toughness imparted by the higher glycol dimethacrylates.

Using diethylene glycol diacetate as a replacement overcomes the problem of volatility but does not overcome the problem of stiffer dough, since the diacetate is also a very strong solvent for methyl methacrylate polymer, e.g., stronger than dibutyl phthalate and processing by mixing and shaping is much more difficult. More serious, however, is the drawback that liquid glycol diacetate or diglycol diacetate is soluble in water, e.g., 14.3 grams of glycol diacetate dissolved in 100 milliliters of water at room temperature and the solubility of the diglycol diacetate is above 6–8% and is extracted in the mouth.

Glycol diacetate is about 100 times less volatile at room temperature than methyl methacrylate. Using the test method of Doolittle in "Industrial Eng. Chem., vol. 27, p. 1169 (1935)" glycol diacetate provides an evaporation rate figure of 100% evaporated after 375 hours at room temperature (25° C.) and atmospheric pressure. Under these conditions methyl methacrylate evaporates 100% in 2.1 hours and diglycol diacetate evaporates 2% in 500 hours.

At elevated temperatures of 100° C. at which the dental dough composition is cured, the vapor pressure of the standard non-volatilie plasticizer is sufficiently high that it must be taken into account during manufacturing in order to achieve a high quality cured dental dough.

This volatility effect is complicated by the enhanced solvency effects which cause more polymer to be dissolved in the monomer over an extended time period thus in turn increasing the viscosity and reducing the workability of the dough.

VAPOR PRESSURE IN mm. Hg AT DIFFERENT TEMPERATURES, ° C.

| Ester | 0.1 m. | 1 mm. | 5 mm. | 10 mm. | 30 | 760 |
|---|---|---|---|---|---|---|
| Dibutyl phthalate | 113° | 148° | 180 | 195 |  | 340° C. |
| Dibenzyl phthalate | 185 | 250 |  |  |  | [2] 277 |
| Tricresyl phosphate | 155° | 200° | 234° | 250° |  |  |
| TEDMA [1] SR 205g | 115° | 150° | 168° | 185° |  |  |
| Methyl glycol phthalate | 129° | 163 | 202 | 218 |  |  |
| Polyglycol dimethacrylate (SR 210) | 105 | 145 | 160 |  |  |  |
| EDMA [1] (SR 206) |  |  |  | 95° | 114° | 350 |
| Butylene glycol dimethacrylate | 73 | 103 | 128 | 140 |  | 290 |

[1] In the foregoing volatility disclosure:
TEDMA = triethylene glycol dimethacrylate.
EDMA = ethylene glycol dimethacrylate.
[2] With decomposition.

The veneer gel restorative products of the invention are outstanding because of their relatively high density and absolute freedom of porosity, a result which is not expected in view of the teaching of Wichterle et al., U.S. 2,976,576 Especially unexpected are the outstanding properties found in the invention of wear resistance, hardness, toughness without brittleness, aging resistance and impact resistance in view of the brittleness of highly strained bulk polymerized dimethacrylate, such as EDMA which was to be expected.

The standard dental gel polymer in dentistry is based on methyl methacrylate polymer and methyl methacrylate monomer dough mix in proportions of 29–40% of monomer and 80–60% of polymer, as disclosed in Vernon et al., U.S. Patent No. 2,234,993, this mixture being tinted, pigmented and shaded. The dough is polymerized by molding at elevated temperatures of up to about 105° C. in the dental flask and at pressures of up to 700 pounds per square inch to simulate the desired part of teeth, palate or gum tissue. About 5–15% dibutyl phthalate plasticizer is used to improve the moisture resistance of the polymer. The polymer which has been plasticized with dibutyl phthalate shows improved molding and handling characteristics.

Due to the reactivity of polymerization of methyl methacrylate monomer in the presence of residual catalyst at room temperature, this Vernon et al. type of dough mixture has to be stored at low temperatures, e.g., in a refrigerator, and in a hermetically sealed container in order to prevent the slow hardening by evaporation of the monomer due to high vapor pressure of the monomer at room temperature (see Vernon, U.S. Patent No. 2,234,993, page 2, column 1, line 74, to column 2, line 2). Once hardened on storage, the Vernon type dough gel cannot be handled at all, and even when stored under the most favorable conditions, it is difficult to handle, e.g., it cannot easily be cut or shaped in the dental mold even though it has been plasticized wth dibutyl phthalate. If excess monomer is added to soften, excessive shrinkage occurs on molding.

Efforts have been made by others to improve this gel, as for example, by Crowell et al. in U.S. Patent No. 2,315,503 and by Gordon in U.S. Patent No. 2,874,832. Crowell et al. proposed that a vinyl ester polymer be used for the solid phase but the kind and amount of reactive monomer, e.g., methyl methacrylate in proportions of 10–40 weight percent based on the total weight of the mixture has rendered the vinyl gel subject to the same defects of high viscosity, poor storability and limited shelf life as the Vernon type gel.

Fox and Loshaek reported efforts to improve the gel in the Journal of Polymer Science, 1951, and suggested that ethylene glycol dimethacrylate, propylene glycol dimethacrylate and hexamethylene glycol dimethacrylate be used to cross-link in mixture with methyl methacrylate monomer in copolymerization in bulk but they found cross-linking efficiencies of between 60–80% in the presence of a free radical polymerization catalyst and temperatures of about 80° C., the copolymerization method being a commercially practical bulk system. Increasing proportions of methyl methacrylate monomer were considered by Fox et al. to be essential and the monofunctional monomer was increased in order to promote the efficiency of polymerization of cross-linking agent whereby the percent of cross-linked groups in the polymer relative to those available was increased, although the total number of cross-links fell. On the basis of this pioneer work, it was expected by those conversant in the art that as the proportion of ethylene glycol dimethacrylate increases from 10 to 20 in the ethylene glycol dimethacrylate-methyl methacrylate liquid system, the peroxide cured products made at 80° C. become increasingly harder, increasingly brittle and increasingly strained. This last characteristic of increasing internal strain means that the mold product in the form of a strip cannot be subjected to grinding or cutting with a sharp tool without fracturing or being liable to fracture along cleavage lines and along internal strain patterns to produce chunks of glossy plastic.

Accordingly, the amounts of cross-linking agents of the ethylene glycol dimethacrylate type has been limited to a predetermined maximum which, if exceeded, is liable to cause excessive internal strains. This addition is recognized as being dependent on temperature of curing, rate of cure, efficiency of cure and accommodation through annealing. Since the peroxide initiator is generally a standard amount and the temperature is controlled with narrow predetermined limits in the dental flask method, there is no alternative before the present invention in dealing with the strain problem except the cutting down of the degree of cross-linking to prevent strain and to look for a limit of cross-linking to achieve the desired hardening benefit.

Increasing lengths of the chain between alcohol groups in the cross-linker provides a low molar cross-linking on a weight basis and a relatively higher efficiency so that sufficient conversion to cross-linked polymer increases the benefits of cross-linking with a loss in hardness. For this reason and based on cost, the practice heretofore was based on ethylene glycol dimethacrylate with the upper limit held below about 25 mol percent even though this cross-linker was less efficient on a weight basis than the longer chain cross-linkers.

Accordingly, prior to the present invention it was not expected that one could achieve formable plastic products free from shattering on griding and cutting from utilizing cross-linking agents as the only component of the monomer phase. This defective inherent characteristic of ethylene glycol dimethacrylate is also exhibited by trimethylol propane trimethacrylate, but the latter is worse in imparting strain when bulk polymerization with benzoyl peroxide, or bulk copolymerized with small amount of methyl methacrylate. It is not readily useful for molding in the presence of other polymer or as the unmodified product, and this defect has made the monomer noncommercial in the use as a homopolymer.

In every instance of homopolymer there are produced brittle products from the diacrylates which have such an inherent tendency to shatter that they cannot be used for whole teeth or for tooth patching material having waterproofing properties.

If these trimethylol propane trimethacrylate products were especially plasticized and properly polymerized by special techniques to provide complex blends, the shattering defect might be overcome but the result could be hardly worth while or suitable for general dental use. In this area of application the requirement for resistance to mechanical extraction, aging resistance, resistance to moisture, resistance to abrasion and impact, and color stability are so difficult to achieve with plasticized mixtures of this type, that the effort for veneer gel use cannot be expected to succeed.

It was, therefore, wholly unexpected and surprising that the present cross-linkers constituting the entire monomer phase be superior in wear resistance to the conventional cross-linked methyl methacrylate veneer gel or cross-linked methyl methacrylate tooth.

Ethylene dimethacrylate as monomer in the dough system is further unsuitable because solvency power is also unduly high and yields a stiff gel which becomes very hard and quickly unworkable, either due to extraction of the catalyst from the polymer or due to simple solvation of the polymer by the monomer to give extremely high viscosity.

Trimethylol propane trimethacrylate is at the other extreme as far as solvency is concerned and is a very poor solvent in the dough system. With the dental polymer in an amount used in a preferred composition, no solvation is observed at room temperature and the composition remains sandy so as to be completely unsuitable for molding and forming in the dental flask. If the composition is molded after special pre-mixing, the tooth obtained is so excessively brittle as to be completely useless.

The polymer in the dough can be prepared in which there is no residual peroxide and this used to improve the dough. For example, it is possible to heat the polymer for 16 hours such that an analysis for residual peroxide shows none. This polymer when mixed with the preferred monomer concentration will not cure in 30 minutes at 212° F., or in 60 minutes so that it is seen, as a practical matter, that (estimated at 0.0% minimum) some residual peroxide is required. However, if the analysis amount of benzoyl peroxide, which is residual in the polymer, is instead added and dissolved in the proportionate amount of monomer and this mixed with the polymer from which the peroxide has been removed, the composition will become hard and unformable within several days. It is apparent from the foregoing examples that the monomer must have the characteristic of solvating the polymer but not extracting the peroxide until the curing step is to be carried out.

*Example 1.—Veneer gel formulation*

90 grams of a suspension polymerized polymer of methyl methacrylate (clear beads 0.5–1.0 mm. diameter) having 10% dibutyl phthalate in the monomer and a residual peroxide of about 0.1% (specification requirement for teeth not more than 0.2%) benzoyl peroxide and molecular weight by viscosity=500,000 was pigmented with:

|  | Gr. |
|---|---|
| F–2100 (fluorescent) zinc oxide | 0.14 |
| Permalba—titanium dioxide magnesium sulfate | 0.025 |
| Cadmium Yellow F–5512 Cadmium sulfate | 0.0015 |
| Cadmium Red F–5893 Cadmuim sulfate | 0.0010 |
| Ivory Black—Carbon black | 0.0005 |

This pigmented tip concentrate was ball milled with 3 pounds of stones for 10 minutes and then mixed with 90 gr. of clear polymer.

To 55 grams of the pigmented polymer above were added 45 grams of SR-205 (triethylene glycol dimethacrylate) containing 200 p.p.m. hydroquinone. The mixture was stirred thoroughly and allowed to stand. At the end of 24 hours the viscosity was such that it would be considered "packable" by acceptable dental techniques for crown and bridge acrylics. After seven days the viscosity was ideal. Some slight increases in viscosity was noted in the next six months in which the gel was left in a jar at room temperature, but at the end of six months the gel could still be easily used for preparation of a veneer.

*Example II*

The same methyl methacrylate polymer as in Example I was prepared using 0.2% azoisobutyryl nitrate as catalyst (molecular weight 600,000) and the polymer was pigmented using a slightly different pigmentation as follows.

| | Gr. |
|---|---|
| Methyl methacrylate polymer (15% butyl phthalylbutyl glycollate (Monsanto B16) | 90 |
| F-2115 (fluorescent) zinc oxide | 0.10 |
| TiO$_2$ (titanium dioxide) | 0.02 |
| Cadmium Yellow F-6489-Cadmium sulfide | 0.0005 |
| Cadmium Orange F-5895-Cadmium sulfide | 0.0008 |
| Iron Black—Iron oxide | 0.0002 |

This pigmented tip material was ball milled with 3 pounds of stones for 10 minutes.

To 70 grams of the above powder were added 30 grams of SR-210 (polyethylene glycol 200 dimethacrylate) to which were added 500 p.p.m. monomethyl ether of hydroquinone. The mixture was stirred. At the end of 8 hours a portion was removed and placed between polyethylene sheets in a slightly warmed mold (45° C.) and was pressed into a shape suitable for use as the incisal portion of an anterior tooth. The gel obtained was similar in stiffness to that of the Luxene standard crown and bridge vinyl resin.

*Example III*

To 60 grams of the polymer of Example II were added 40 grams of 1,6-hexamethylene glycol dimethacrylate to which 500 p.p.m. dimethyl cyclohexyl amine were added. This mixture was stirred and allowed to stand for 7 days after which it was usable dough. The dough was processed to make an inlay as in Example VI.

*Example IV.—Tooth composition*

A bead polymer was prepared by a suspension polymerization of methyl methacrylate with 10% dibutyl phthalate and 0.5% benzoyl peroxide by the method in Example I. The molecular weight was 425,000. This polymer was pigmented as a body shade:

| | Gr. |
|---|---|
| Polymer | 45.4 |
| Brown concentrate* (burnt sienna) | 0.366 |
| Red concentrate* (cadmium selenide) | 0.91 |
| Yellow concentrate* (cadmium selenide) | 1.530 |
| Black concentrate* (carbon black) | 3.660 |
| TiO$_2$ (titanium dioxide) | 1.3 |

*Made by using 1 part pigment and 99 parts polymer and ball milling.

The pigmented polymer was mixed on a muller for 5 minutes.

To 60 grams of the above polymer were added 40 grams of SR-205 (triethylene glycol dimethacrylate) containing 60 p.p.m. hydroquione. The mixture was stirred and allowed to stand two days and made into a tooth as in Example VII.

*Example V*

A polymer is prepared by a suspension polymerization of methyl methacrylate with 7% dibutyl phthalate and 0.4% benzoyl peroxide as in Example I. The molecular weight was 550,000.

This polymer was pigmented as a body shade:

| | Gr. |
|---|---|
| Polymer | 45.4 |
| Brown concentrate* (burnt sienna) | 0.366 |
| Red concentrate* (cadmium selenide) | 0.91 |
| Yellow concentrate* (cadmium selenide) | 1.530 |
| Black concentrate* (carbon black) | 3.660 |
| TiO$_2$ (titanium dioxide) | 1.3 |

*Made by using 1 part pigment and 99 parts polymer and ball milling.

The pigmented polymer was mixed on a muller for 5 minutes.

To 60 grams of the above polymer were added 40 grams of SR-205 (triethylene glycol dimethacrylate) containing 60 p.p.m. hydroquinone. The mixture was stirred and allowed to stand two days and made into a tooth as in Example VII.

*Example VI.—Curing of veneer gel as an inlay*

The normal procedure for preparing an inlay was followed. A body dough was prepared using Justi "namilon" Shade "65".[1] This body was cured in the flask for 15 minutes at 212° F. The top was then removed and the body material ground away to the desired shape of the incisal. The gel from Example I was placed on the surface of the body, and then the top of the slightly heated mold was pressed down. The gel tip was then cured at 212° F. for 30 minutes. The flask was cooled on the bench for 30 minutes, then the inlay broken out, finished, polished and finally inserted into a central tooth as a class 4 inlay. There was no sign of wear, abrasion or color change in this inlay for one year.

*Example VII.—Curing of the tooth composition*

The tooth body composition as prepared in Example IV was formed as the surface of the body of posterior teeth and was formed around a core of lightly cross-linked standard acrylic dough. This two layered body was cured in a metal mold such that the top of the mold was designed to follow the desired contour of the body shade of the tooth. The material was cured for three minutes at 98° C. with 1700 p.s.i. The top of the mold was removed and an incisal disc made from the composition shown in Example IV was placed on the surface. A second top to the mold having the shape of the final tooth was placed on the surface and the mold placed in a press at 98° C. for 3 minutes. Finally, the mold was post cured for 3 minutes at 150° C.

The tooth prepared in this manner is hard and tough and withstood all the abuse tests used for evaluating commercial and experimental teeth. It also grinds very hard (porcelain-like) on the wheel and can be polished to a high finish.

Shrinkage on polymerization of the triethylene glycol dimethacrylate (SR-205) is theoretically 69% of the comparative shrinkage of methyl methacrylate. Since the efficiency of polymerization is about 80%, the actual shrinkage is closer to 55% of methyl methacrylate. The chances are very high that at least one end group is polymerized and hence non-extractable. Thus, 55 parts polymer to 45 parts monomer of triethylene glycol dimethacrylate (SR-205) is very close to the 2 parts of copolymer to 1 part of methyl methacrylate monomer by weight when total shrinkage on polymerization is compared. In clinical tests this theoretical result is confirmed by the absence of "lakes" or "dents" which are observed in a crown when processed from a dough containing excessive monomer.

In each of the foregoing examples, the suspension polymer of methyl methacrylate was prepared by the standard procedure originally developed by Crawford and disclosed in U.S. Patent No. 2,108,044 and U.S. Patent No. 2,191,520, the preferred suspension stabilizing agents ---
[1] Justi "Namilon" Shade "65"=a pigmented acrylic polymer of grey-white hue of inorganic pigments as in Example V.

being either starch or methyl cellulose. The particle size distribution is preferably between No. 80 sieve and No. 200 sieve when the polymer product in the formulations of the invention is employed for dental purposes. A typical distribution of the polymer powder which is useful for the dental applications of the invention is as follows:

| Retained on Sieve No.. | Percent | | | | | |
|---|---|---|---|---|---|---|
| | 30 | 60 | 80 | 100 | 200 | Over 200 |
| Material: | | | | | | |
| Denture Base | 0 | 1-5 | 30-40 | 20-30 | 10-15 | 1 |
| Tooth Restorative | 0 | 1-5 | 20-30 | 10-15 | 30-40 | 0.2-2 |

The powder particles intended for tooth restorative purposes are somewhat finer spherical granules than those for denture base structures. The tooth restorative products are otherwise similar to denture resins. Usually the powders are not uniform in particle size, but instead most products contain a controlled range of sizes.

The foregoing illustrative examples of particle size extend to methacrylate copolymers, the methacrylate copolymers product made by polymerizing liquid material containing 60% methyl methacrylate and 40% ethyl acrylate, or 30% methyl methacrylate, 30% butyl methacrylate and 40% ethyl acrylate which have rubbery characteristics while retaining surface hardness, the products containing the higher proportions of methyl methacrylate being harder than the products containing the lower proportions.

As long as at least about 60% by weight of the liquid polymerizable monomer material is either mathacrylate ester, other polymerizable monomers may be added in limited amounts to modify the properties of the polymer, the resulting modification in properties being known in the prior art. Up to 40% of vinyl aromatic monomers such as styrene, vinyl toluene, confer aromatic solvent-solubility to the product; up to 40% of acrylic acid esters of lower monohydric aliphatic alcohols having from 6 to 8 carbon atoms may be employed to provide an elasticizing action with improved adhesion to the solid polymer produced.

Up to 10% of methacrylic acid, itaconic acid or acrylic acid may be mixed with the methacrylate ester.

Smaller particle size distribution may be provided by known methods of emulsion polymerization to achieve particles between 0.01 and 0.4 microns.

Suitable catalysts in the polymerization are the free radical polymerization catalysts such as peroxides, e.g., benzoyl peroxide, phthaloyl peroxide, substituted benzoyl peroxides, acetyl peroxide, caproyl peroxide, lauroyl peroxide, cinnamoyl peroxide, acetyl benzoyl peroxide, methyl ethyl ketone peroxide, sodium peroxide, hydrogen peroxide, di-tert. butyl peroxide, tetraline peroxide, urea peroxide, etc., the hydroperoxides, e.g., cumenehydroperoxide, p-menthane hydroperoxide, di-isopropyl-benzene hydroperoxide, tert. butyl hydroperoxide, methyl ethyl ketone hydroperoxide, 1-hydroxy-cyclohexyl hydroperoxide-1, etc., azo compounds such as 2,2'-azo-bis-isobutronitrile, 2,2'-azo-bis-isovaleronitriles, etc., the per compounds, e.g., ammonium persulfate, sodium perborate, sodium perchlorate, potassium persulfate, etc.

The catalysts may be used alone or in admixture with one another. Benzoyl peroxide is the preferred catalyst. Any suitable amount of the catalyst may be used, but in general the catalyst concentration that gives satisfactory results may be within the range of 0.1 and 2.0 percent by weight of the entire polymerizable mass.

In dental compositions, use may also be made of vermillion, sulfides of mercury, and cadmium red with zinc or titanium oxide to produce the desired pink shade in denture base resin. Cadmium yellow can be used for deep yellow to orange color. Such pigments as carbon black and the oxides of iron, zinc or titanium are harmless and may be employed with success to produce various shades of gray and brown. The burnt and raw umbers and siennas, and the ochres are useful for producing variations in brown shades. Other useful pigments for specific shadings include ultramarine blue and chrome green and yellow. The pigments employed in dental porcelain can be utilized also for methacrylate crowns and inlays, while any pigment employed in dental rubber can be used in the mixture of the invention. Soluble dyes often tend to bleach to a lighter shade in the mouth, for which reason they are generally undesirable. In the commercial dental products now available, the pigments are usually all fairly stable. Except for the clear transparent shades, most resins have varying degrees of opacity. The oxides of zinc or titanium serve as opacifying agents. Titanium dioxide is the more effective of the two, so that only minute quantities are required.

*Curing of crown and bridge and veneer gel.*—The preferred method utilized 30 minutes in a plaster or stone mold in a water bath at 212° F.

It is also possible to heat the gel with a hot lamp press and form it with a mold, remove the mold, and complete the cure with the hot lamp. This cure generally takes 15 minutes or less. One disadvantage of not keeping on the mold top is the inability to retain detail of the mold. However, for many uses this is unimportant. The tooth may be shaped additionally by curing during pressing with a hot tool.

The preferred method for molding the present composite tooth is by compression molding at a relatively low temperature in a metal mold or dental flask, e.g., about 217° F. and utilizing high pressures of 2000–10,000 p.s.i. to achieve maximum density flask and gloss porcelain-like surface. Tooth products so made are characterized by dimensional tolerances as close as 0.0005 inch.

From the foregoing, it will be seen that the suitable liquid difunctional methacrylate esters which are uniquely adapted in the composition for manufacturing molded teeth are the following:

(A)

Diethylene glycol dimethacrylate
Triethylene glycol dimethacrylate
Tetraethylene glycol dimethacrylate
Polyethylene glycol dimethacrylate from polyethylene glycol 200
Polyethylene glycol dimethacrylate from polyethylene glycol 400
Polyethylene glycol dimethacrylate from polyethylene glycol 600
Neopentyl glycol dimethacrylate
2-methyl-2-butyl propane dimethacrylate
Tetramethylene glycol dimethacrylate
Hexamethylene glycol dimethacrylate
1,3-butylene glycol dimethacrylate
1,3-propylene glycol dimethacrylate (B)

Diethylene glycol diacrylate
Triethylene glycol diacrylate
Tetraethylene glycol diacrylate
Polyethylene glycol 200 diacrylate
Polyethylene glycol 400 diacrylate
Polyethylene glycol 600 diacrylate
Neopentyl glycol diacrylate
Hexamethylene glycol diacrylate
1,3-butylene glycol diacrylate
1,3-propylene glycol diacrylate For medium temperature curing, e.g., 60–100° C., benzoyl peroxide or lauroyl peroxide may be used. Azobisisobutyronitrile is a typical example of an azo free radical catalyst which gives a high degree of polymerization product at lower temperature, e.g., 60° C., and a lower degree of polymerization product at higher temperature, e.g., 75–100° C.

Promoters, such as aromatic amines, ascorbic acid, cobalt salts or REDOX activators, may be used with the free radical polymerization catalyst, such as organic or inorganic peroxide.

The tertiary amine activators are particularly preferred, such as N,N-dimethylaniline, N,N-dimethyl-p-toluidine, dimethylcyclohexyl amine, or trihexylamine with such syrups. This type of activator is used with advantage in the denture applications of the invention.

The process of using these peroxides does not require the careful control of the polymerization, particularly during the accelerated exotherm stage as in the curing of polyesters, in order to obtain a bubble-free product with good clarity and other properties desired. The difficulties of removal of dissolved gases, adjustment for the shrinkage in volume and adequate control of the exotherm are not encountered in the present putty mixture, especially after the material has reached the gel consistency. The present mixtures may be polymerized using more than one catalyst over more than one temperature. The present mixture may be used in essentially the same manner, as in the use of methacrylate for embedding purposes.

The great advantage is had in the peroxide catalyzed bulk polymerization of methyl methacrylate that, after about 20–30% conversion to polymer, the rate of polymerization is greatly accelerated, and that this rate of acceleration is accompanied by a corresponding increase in the degree of polymerization.

Glass-filled doughs may be used in the fabrication of reinforced parts where molding difficulties are encountered with standard methods.

Preferably, chopped glass fibers in conjunction with supplementary fillers are used, the fiber content varying from 5 to 30%, depending on the ratio of the supplementary fillers. The filled putties may be preformed. The molded part provides smooth surfaces with few flow lines at the areas of glass orientation and any temperature of curing may be used as desired.

The preformed putty in strip form is protected in a package form by supporting it on a detachable facing sheet or by containing between detachable facing sheets. The preformed putty strip can be cut into slugs. In this form, it is useful for patching and restoring by polymerizing it at elevated temperatures up to about 212° F. and at elevated pressures, if desired.

I claim:
1. A package comprising a supporting sheet and a preformed strip of storage-stable pigmented putty which is readily detachable from said supporting sheet, said putty being adapted to be stored on a shelf for long periods of time at room temperature without hardening or drying out, said putty consisting of: an opacifying inert stable solid pigment; a non-volatile liquid polymerizable dimethacrylate ester of a polyhydric alcohol selected from the group consisting of aliphatic glycols having 4 to 8 carbon atoms, polyethylene glycol having a degree of polymerization from 2 to 6 and polypropylene glycol having a degree of polymerization from 2 to 6; said liquid ester being less volatile than dibutyl phthalate and the sole liquid component of said putty; and, as a thickener for said liquid component, solid finely divided methyl methacrylate polymer which is intimately dispersed with said liquid dimethacrylate ester in proportions to make a putty consistency, said methyl methacrylate polymer being prepared by peroxide polymerization and containing an amount of peroxide sufficient to polymerize said putty when said putty is heated to a curing temperature of about 212° F. for longer than 15 minutes.

2. A package as claimed in claim 1, wherein said putty in strip form is contained between top and bottom detachable sheets and said pigment is selected from the group consisting of titanium oxide, zinc oxide, copper oxide, iron oxide, cobalt oxide, barium sulfate, cadmium selenide, cadmium sulfate and mixtures thereof.

3. A package as claimed in claim 1, wherein said putty strip includes one portion pigmented in a dark shade and another portion pigmented in a light shade.

4. A package as claimed in claim 1, wherein said liquid dimethacrylate ester is triethylene glycol dimethacrylate.

5. A putty adapted to be stored on a shelf for long periods of time at room temperature without hardening or drying out, consisting of: an opacifying inert stable solid pigment; a non-volatile liquid polymerizable dimethacrylate ester of a polyhydric alcohol selected from the group consisting of aliphatic glycols having 4 to 8 carbon atoms, polyethylene glycol having a degree of polymerization from 2 to 6 and polypropylene glycol having a degree of polymerization from 2 to 6; said liquid ester being less volatile than dibutyl phthalate and the sole liquid component of said putty; and, as a thickener for said liquid component, solid finely divided methyl methacrylate polymer which is intimately dispersed with said liquid dimethacrylate ester in proportions to make a putty consistency, said methyl methacrylate polymer being prepared by peroxide polymerization and containing an amount of peroxide sufficient to polymerize said putty when said putty is heated to a curing temperature of about 212° F. for longer than 15 minutes.

References Cited by the Examiner

UNITED STATES PATENTS

| | | | |
|---|---|---|---|
| 2,296,877 | 9/1942 | Slack | 260—33.4 |
| 2,385,612 | 9/1945 | Contlee | 206—59 |
| 2,557,574 | 6/1951 | Shonberg | 206—59 |
| 2,745,813 | 5/1956 | Logemann et al. | 260—33.4 X |
| 2,874,832 | 2/1959 | Gordon | 206—63.5 |
| 3,027,642 | 4/1962 | Strack | 32—8 |
| 3,069,773 | 12/1962 | Saffir | 32—8 |
| 3,075,640 | 1/1963 | Snyder | 206—56 |
| 3,098,053 | 7/1963 | Hallonquist | 260—33.4 X |

THERON E. CONDON, *Primary Examiner.*

J. M. CASKIE, *Assistant Examiner.*